Oct. 8, 1968            H. VISSERS            3,404,644
SPREADING AND HARROWING IMPLEMENT INCLUDING MEANS FOR UNIFORMLY
SPREADING GRANULAR OR PULVERULENT MATERIAL ON THE SOIL
Filed Aug. 14, 1967            3 Sheets-Sheet 1
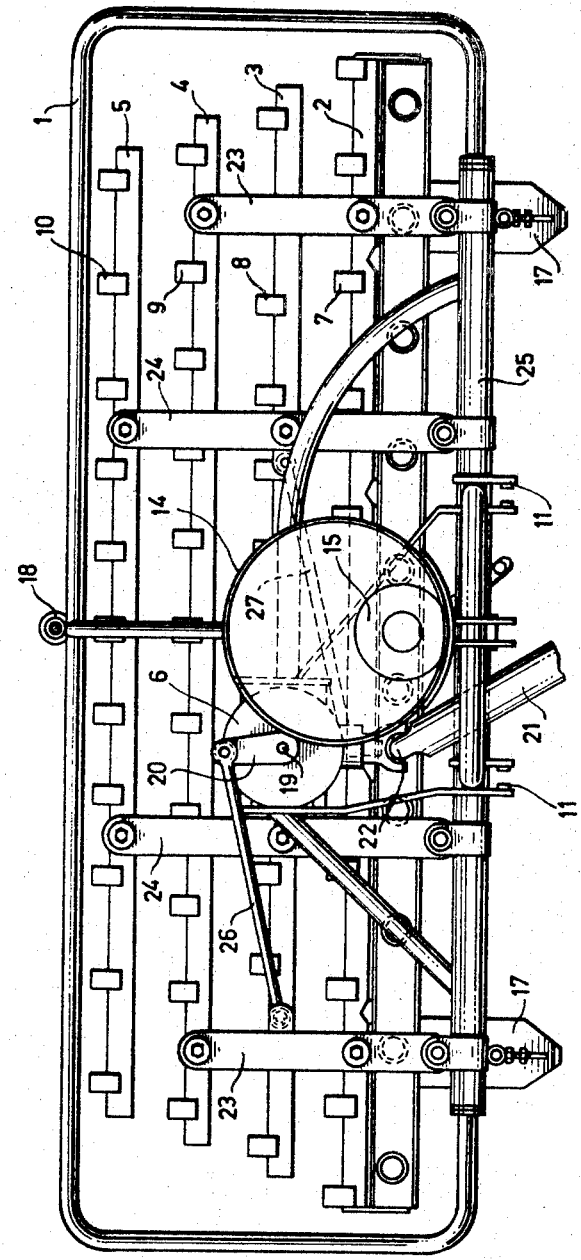
INVENTOR.
*HERBERT VISSERS*
BY

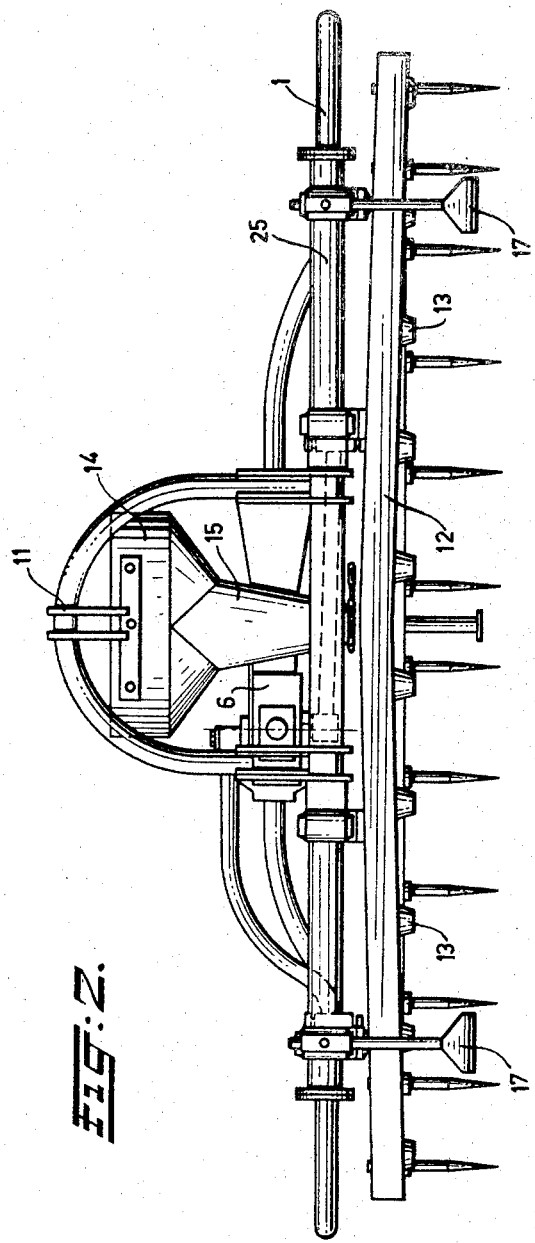

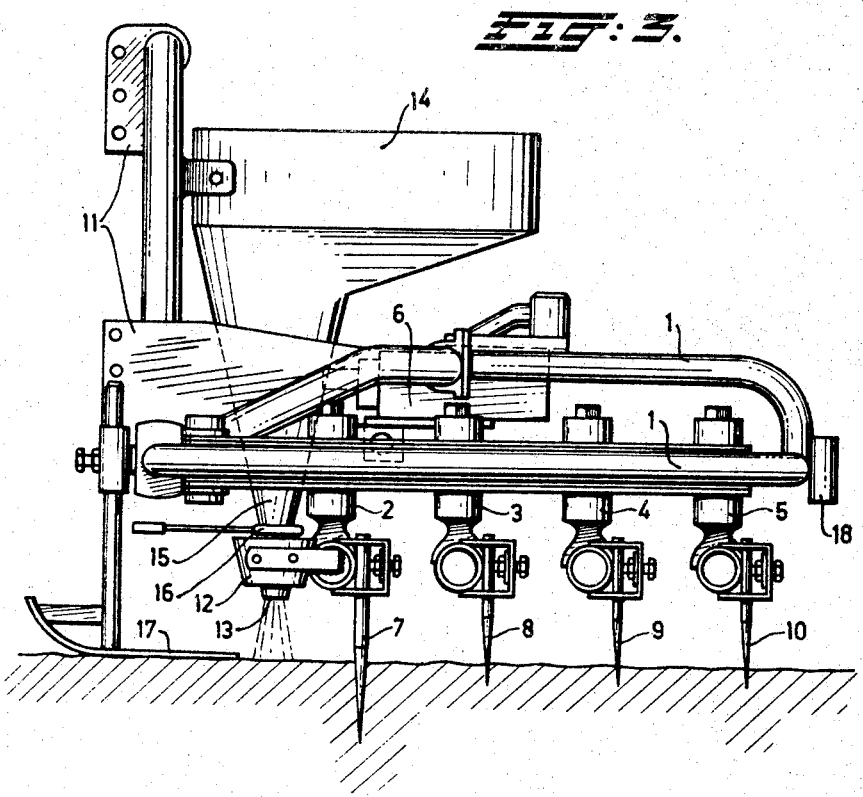

United States Patent Office 3,404,644
Patented Oct. 8, 1968

3,404,644
SPREADING AND HARROWING IMPLEMENT INCLUDING MEANS FOR UNIFORMLY SPREADING GRANULAR OR PULVERULENT MATERIAL ON THE SOIL
Herbert Vissers, Spoorstraat 4,
Nieuw-Vennep, Netherlands
Continuation-in-part of application Ser. No. 524,937, Feb. 3, 1966. This application Aug. 14, 1967, Ser. No. 660,324
Claims priority, application Netherlands, Feb. 5, 1965, 6501462
3 Claims. (Cl. 111—11)

ABSTRACT OF THE DISCLOSURE

The combination of a material dispenser with a harrow comprising tine carrying beams reciprocating in a direction transverse to the travel direction of the harrow, and common driving means for reciprocating the dispenser as well as the beams.

---

The present application is a continuation-in-part of the copending parent application filed Feb. 3, 1966 and having the Ser. No. 524,937 by the same named inventor.

Background of invention

The invention relates to a spreading and harrowing implement including means for uniformly spreading granular or pulverulent material on the soil, at least two harrow tine carrying beams, and means for reciprocating said beams in a direction transverse to the direction of advance of the implement.

In the branches of agriculture and horticulture it occurs often that small quantities of weed killer (herbicide) should be uniformly spread on a certain surface. It is not only of importance that the material is regularly distributed, but also that in connection with its toxicity it is introduced as rapidly as possible into the ground after having been strewn.

For that purpose a distributing device with e.g. a rotary disc can be employed, whereupon, by harrowing, the strewn material is worked into the ground. This method is, however, disadvantageous in that no uniform distribution is obtained and the poisonous material remains for some time upon the ground so that birds can get at it.

It is an object of the invention to obviate this disadvantage by starting from a harrow of the type having at least two harrow tine beams which are capable of reciprocation in a direction transverse to the direction of advance of the implement.

It is a further object of the invention to realise a uniform distribution of the material which almost immediately after strewing is covered with earth.

Another object of the invention is to render the implement suitable for grain material of different size and weight.

The implement comprises a harrow including tine carrying beams that are reciprocated transversely of the direction of travel, material spreading beams including a fixed supply hopper, a dispenser disposed in front of and coextensive with the width of the beams, and means for reciprocating said dispenser simultaneously with said beams. Conveniently, the dispenser is carried by the front beam and has discharge nozzles in front of the tines.

The foregoing and other objects and advantages of the invention will appear in the description to follow. In the description reference is made to the accompanying drawings, which form a part hereof, and in which there is shown by way of illustration and not of limitation a specific form in which the invention may be embodied.

Brief description of drawing

FIG. 1 is a plan view of the implement;
FIG. 2 is a front view, and
FIG. 3 is a side view of the implement.

Description of preferred embodiment

FIG. 3 shows a harrow which comprises a frame 1 carrying a number of beams 2–5 which are reciprocated through a driving device 6 in such a way that they perform a movement in their longitudinal direction, consequently transverse to the direction of travel going from right to left in FIG. 3. The beams 2–5 carry harrow tines 7–10; the harrow being drawn by a tractor (not shown) connected through a three point hitch 11.

A channel shaped metering dispenser 12 is secured to the front beam 2. This dispenser lies in front of the tines 7 and has a bottom which is inclined from the centre toward the sides (vide FIG. 2), apertures 13 being provided in this bottom. The size and the number of these apertudes are dependent on the nature of the material to be distributed and on the quantity thereof to be introduced into the ground. Although this possibility is not indicated in the drawing, the bottom can consist of an interchangeable insert, f.i. guided along the bent lower edges of the side walls of the dispenser 12. The inserts may have apertures of a different diameter, the number of apertures being larger or smaller, so that in a simple way an adaptation to the material to be distributed becomes possible.

The material to be distributed is contained in a hopper 14 secured to the frame 1. By means of a funnel 15, the hopper 14 communicates with the centre of the dispenser 12. The material is thus centrally supplied. Due to the reciprocation, and assisted by the slant of the bottom of the dispenser, the material is spread on the ground on a front as broad as the length of the dispenser. A regulator 16, may be accommodated in the funnel 15, so that the quantity of material supplied to the gully can be regulated within definite limits.

The implement or harrow as shown in FIG. 3 is supported near its front side by two shoes 17. At the rear of the frame 1 a sleeve 18 is secured for inserting a third supporting shoe, in case the three point hitch 11 is disconnected.

The driving device 6 for the beams 2–5 comprises a vertical driven shaft 19 both ends of which have a crank 20. The upper crank is shown in FIG. 1 and the lower crank (not shown) is angularly displaced over about 180° with respect to the upper crank 20. The driving device receives its energy from the power take off shaft of a tractor (not shown) via an intermediate shaft 21, a universal coupling 22 and a conical drive accommodated within the casing of the device 6.

The beams 2–5 are supported in the frame 1 by means of a pair of short arms 23 and a pair of long arms 24. FIG. 1 shows clearly that—as seen from the front side of the harrow—the first and third beams 2 and 4 are pivotally connected to the arms 23 whilst the beams 3 and 5 are pivotally connected to the arms 24. All four arms 23, 24 are pivotally connected to the front beam 25 of the frame 1. The upper crank 20 of the driving device 6 is connected through a rod 26 with one of the short arms 23. The lower crank 20 is connected through a rod 27 to one of the longer arms 24. A rotation of the cranks 20 will cause a reciprocating movement of the beams 2–5 in such a way that adjacent beams move in opposite directions. As the dispenser 12 is connected with the front beam 2, it will also perform a reciprocating movement so as to distribute the material discharged from the hopper 14 regularly along the whole length of the dispenser. In this manner a uniform and predetermined stream of powder or granular material issues from the apertures 13. It is also possible to give the dispenser 12 its own drive, but the shown embodiment gives the most economic and satisfactory solution.

While a preferred embodiment of the invention has been shown and described, it is to be understood that changes and variations may be made without departing from the spirit and scope of the invention as defined in the appended claims.

What I claim is:

1. A spreading and harrowing implement including means for uniformly spreading granular or pulverulent material on the soil, comprising a frame, at least two harrow tine carrying beams moveably mounted on said frame, and means for reciprocating said beams in a direction transverse to the direction of advance of the implement, a supply hopper mounted on said frame, a channel-shaped metering dispenser disposed below said hopper, adjacent and in front of the front one of said beams, and means connecting said and operatively connected with said reciprocating means to be simultaneously reciprocated with said tines in said transverse direction, the dispenser having the same operative width as the harrow beams and being provided with a number of downwardly directed discharge apertures for the material.

2. An implement according to claim 1, wherein said dispenser is mounted on said front harrow beam for reciprocation therewith.

3. An implement according to claim 2, wherein said bottom of the dispenser is inclined from the centre toward the sides, the material being fed from the hopper to this centre.

References Cited

UNITED STATES PATENTS

| | | | |
|---|---|---|---|
| 32,599 | 6/1861 | Foster | 172—102 XR |
| 147,874 | 2/1874 | Smith | 111—11 |
| 3,186,495 | 6/1965 | Gijzenberg | 172—102 |

ROBERT E. BAGWILL, *Primary Examiner.*